(12) United States Patent
Lin

(10) Patent No.: US 7,697,148 B2
(45) Date of Patent: Apr. 13, 2010

(54) METHOD OF RECOGNIZING AND TRACKING MULTIPLE SPATIAL POINTS

(76) Inventor: Ming-Yen Lin, 6F., No. 15, Lane 12, Singjhong Rd., Nangang District, Taipei City (TW) 115

( * ) Notice: Subject to any disclaimer, the term of this patent is extended or adjusted under 35 U.S.C. 154(b) by 244 days.

(21) Appl. No.: 12/105,630

(22) Filed: Apr. 18, 2008

(65) Prior Publication Data

US 2008/0259355 A1 Oct. 23, 2008

(30) Foreign Application Priority Data

Apr. 18, 2007 (TW) ............................... 96113579 A

(51) Int. Cl.
*G01B 11/14* (2006.01)
(52) U.S. Cl. ...................................... 356/614; 356/620
(58) Field of Classification Search .................. 356/614, 356/620

See application file for complete search history.

(56) References Cited

U.S. PATENT DOCUMENTS 6,027,216 A * 2/2000 Guyton et al. ............... 351/200
6,078,681 A * 6/2000 Silver ......................... 382/133

OTHER PUBLICATIONS

Ming-Yen Lin, Method of Recognizing and Tracking a Spatial Point, USPTO U.S. Appl. No. 12/047,159, filed Mar. 12, 2008.

* cited by examiner

*Primary Examiner*—Roy Punnoose
(74) *Attorney, Agent, or Firm*—WPAT, PC; Justin King

(57) ABSTRACT

The present invention relates to a method of recognizing and tracking multiple spatial points, and more particularly to a method of measuring coordinates of a plurality of point light sources by an optical system comprised of a plurality of 1D optical lens modules and a logical analysis method to achieve the purpose of recognizing and tracking multiple spatial points.

23 Claims, 13 Drawing Sheets

METHOD OF RECOGNIZING AND TRACKING MULTIPLE SPATIAL POINTS

FIELD OF THE INVENTION

The present invention relates to a method of recognizing and tracking multiple spatial points, and more particularly to a method of measuring coordinates of a plurality of point light sources by an optical system comprised of a plurality of 1D optical lens modules and a logical analysis method to achieve the purpose of recognizing and tracking multiple spatial points.

BACKGROUND OF THE INVENTION

In a method of recognizing and tracking a spatial point as described in U.S. patent application Ser. No. 12,047,159, an embodiment is used for illustrating the method of the patent application. In the method, vertically and horizontally arranged 1D optical lenses are used for computing the coordinates of the position of a point light source (or an object point) according to the position of a line image and a related convergent parameters, but the method is not applicable for a plurality of point light sources arranged in a specific space as illustrated in the following examples.

In an 1D vertical focusing lens 1 (which is represented by a short double arrow headed line in FIG. 1(*a*), and the arrow direction represents the focusing direction of the 1D optical lens) as shown in FIG. 1(*a*), the line image positions of point light sources $o_1$, $o_2$ disposed at different vertical positions are $i_{y1}$, $i_{y2}$ respectively, such that the 1D optical lens 1 can analyze and recognize the point light sources $o_1$, $o_2$ in the vertical direction. However, the same line image position $i_{y1}$ is obtained when the point light sources $o_1$, $o_1'$ are both disposed on a plane of Z=C (which is a plane perpendicular to the optical axis Z) and situated on the same horizontal line. In other words, the 1D optical lens 1 cannot analyze and recognize the point light sources $o_1$, $o_1'$ in the horizontal direction.

For the 1D horizontal focusing lens 2 as shown in FIG. 1(*b*), the point light sources $o_1$, $o_2$ are disposed at different horizontal positions and their line images positions are $i_{x1}$, $i_{x2}$ respectively, such that the 1D optical lens 2 can analyze and recognize the point light sources $o_1$, $o_2$ in the horizontal direction. However, the same line image position $i_{x1}$ is obtained when the point light sources $o_1$, $o_1'$ of the 1D horizontal focusing lens 2 are both disposed on a plane of Z=C (which is a plane perpendicular to the optical axis Z) and situated on the same vertical line. In other words, the 1D optical lens 2 cannot analyze and recognize the point light sources $o_1$, $o_1'$ in the vertical direction. Therefore, if the plurality of point light sources disposed at a plane perpendicular to the optical axis (hereinafter referred to as an optical axis perpendicular plane) are arranged at positions perpendicular to the focusing direction, the images will be superimposed, and the spatial positions of the plurality of point light sources cannot be recognized.

As described in the aforementioned patent, three 1D optical lens arranged in a fixed space are used, and if any two or more point light sources are disposed at the optical axis perpendicular plane of any 1D optical lens and arranged at positions perpendicular to the focusing direction of that 1D optical lens, the 1D optical lens will lose the recognition function. This result can be shown clearly by the following theoretical analysis.

Refer to FIG. 2(*a*) for the schematic view of the principle of imaging by a 1D vertical focusing lens.

After an object point of a point light source located at $P(0,Y_P, Z_P)$ forms a line image at the position $I(0,y_i,0)$ by the 1D optical lens 3, the relation between positions of the object point and the line image follows the principle of geometric optical imaging as shown in the following equation.

$$\frac{1}{l_o} + \frac{1}{l_i} = \frac{1}{f} \quad (1)$$

Where $l_o$ is the object distance of the point light source $P(0,Y_p,Z_p)$, $l_i$ is the image distance, and f is the focal length of the 1D optical lens 3. In the theory of geometric optical imaging, a non-deviated light exists between the point light source $P(0,Y_p,Z_p)$ and the image point $I(0,y_i,0)$, and the light passes through a geometric center $O_{lens}$ of the 1D optical lens 3. If the object distance $l_o$ is much greater than the image distance $l_i$, or $l_o \gg l_i$, then the relation of $l_i = f$ can be obtained.

Refer to FIG. 2(*b*) for the schematic view of the imaging characteristics of a 1D vertical focusing lens.

For a point light source arbitrarily disposed at $P(0,Y_p,Z_p)$, a transverse line image is formed by the 1D vertical focusing lens 3 and situated at a position $I(0,y_i,0)$ For another arbitrary point light source $\overline{P}(X_p,Y_p,Z_p)$ situated in the same horizontal direction, the formed image is also a transverse line and situated at the same position $I(0,y_i,0)$. Therefore, $P(0,Y_p,Z_p)$ is defined as an axial point light source, and $\overline{P}(X_p,Y_p,Z_p)$ is defined as a conjugated point light source of $P(0,Y_p,Z_p)$.

Refer to FIG. 2(*c*) for a schematic view of the characteristics of imaging of a 1D optical lens in arbitrary focusing direction.

As to the coordinate system O(X,Y,Z), the focusing direction of the 1D focusing lens is rotated at an angle θ with respect to axis Z. A new coordinate system $O_1(x,y,z)$ superimposed on the coordinate system O(X,Y,Z) is defined, such that the x–y axes are also rotated at an angle θ with respect to axis Z. Therefore, in the new coordinate system $O_1(x,y,z)$, let $P_1(0,y_p,z_p)$ be an axial point light source and $\overline{P}_1(x_p,Y_p,z_p)$ be a conjugated point light source of $P_1(0,y_p, z_p)$ In the coordinate system O(X,Y,Z), the coordinate of $\overline{P}_1(x_p,y_p,z_p)$ is $\overline{P}(X_p,Y_p,Z_p)$.

Refer to FIG. 2(*d*) for a schematic view of a 1D optical lens arranged arbitrarily in the space.

In the world coordinate system O(X,Y,Z), also named as a visual space coordinate system, the point light source $\overline{P}_i$ is disposed at a position $(X_i,Y_i,Z_i)$, where $1 \leq i \leq N$ and N is any integer, and the coordinates $(X_i,Y_i,Z_i)$ of the point light source $\overline{P}_i$ are also named as object point coordinates. As to the coordinates of all point light sources, they are called object point group coordinates and defined as the center coordinates of an object point group as follows:

$$X_C = \frac{\sum_{i=1,N} X_i}{N}; Y_C = \frac{\sum_{i=1,N} Y_i}{N}; Y_C = \frac{\sum_{i=1,N} Z_i}{N} \quad (2)$$

The Z-axis of the world coordinate system is rotated at an angle Θ with respect to Y-axis first, then is rotated at an angle Φ with respect to X-axis, wherein the positive and negative values of the angle are defined according to the right hand rule. Therefore, the rotated world coordinate system can be defined as O″(X″,Y″,Z″). Further, several other image coordinate systems $O_j''(X_j'',Y_j''Z_j'')$ can be defined, so that the origin of the image coordinate system $O_j''(X_j'',Y_j'',Z_j'')$ is situated at the position $(h_{xj},h_{yj},h_{zj})$ of the world coordinate system $O''(X'',Y'',Z'')$. For simplicity, FIG. 2(d) only shows the components of $h_{xj}$. Further, a 1D vertical focusing lens $L_j$ is set on a $Z''_j$ axis of the image coordinate system $O_j''(X_j'',Y_j'',Z_j'')$ and at a position $f_j$ from the origin of the image coordinate system, wherein $F_j$ is the geometric center of the 1D optical lens $L_j$, and $f_j$ is the focal length. Further, the image coordinate system $O_j''(X_j'',Y_j'', Z_j'')$ is rotated at an angle $\theta_j$ with respect to the $Y_j''$ axis first, and then is rotated at an angle $\rho_j$ with respect to the $Z'''_j$ axis, wherein the positive and negative values of the angle are defined according to the right hand rule. Therefore, the rotated image coordinate system can be defined as $O_j''(X_j'',Y_j'',Z_j'')$. Let the object distance of the point light source $\overline{P}_i$ be much greater than the focal length $f_j$, and the plane of the focal point becomes an image plane situated on the plane $X_j''$–$Y_j''$ and $Z_j''=0$ of the image coordinate system $O_j''(X_j'',Y_j'',Z_j'')$. In the world coordinate system $O''(X'',Y'',Z'')$, the point light source $\overline{P}_i$ is situated at the position $\overline{P}_i''(X_i'',Y_i'',Z_i'')$, and in the image coordinate system $O_j''(X_j'',Y_j'',Z_j'')$ the point light source $\overline{P}_i$ situated at the position $\overline{P}_{ij}(x_{oij},y_{oij},z_{oij})$. In the image coordinate system $O_j''(X_j'',Y_j'',Z_j'')$, let the point light source $\overline{P}_{ij}(x_{oij},y_{oij},z_{oij})$ be the conjugated point light source and $P_{ij}(0,Y_{oij},z_{oij})$ be the axial point light source. Then the line image position of $P_{ij}(0,y_{oij},z_{oij})$ is situated at $I_{ij}(0,y_{sij},0)$, and their geometric optical relation is given below:

$$y_{oij} = -\frac{z_{oij} - f_j}{f_j} y_{sij} \qquad (3)$$

According to the relation of coordinate transformation between the image coordinate system $O_j''(X_j'',Y_j'',Z_j'')$ and the world coordinate system $O(X,Y,Z)$ and the spatial geometric arrangement of the point light sources in the world coordinate system $O(X,Y,Z)$, the necessary quantity of 1D optical lenses $L_j$ can be derived and the coordinate $(X_i,Y_i,Z_i)$ of each point light source $\overline{P}_i$ in the world coordinate system $O(X,Y,Z)$ can be calculated. The derivation and calculation are discussed as follows:

The relation of coordinate transformation between the image coordinate system $O_j''(X_j'',Y_j'',Z_j'')$ and the world coordinate system $O(X,Y,Z)$ is given below:

$$\begin{pmatrix} X_i \\ Y_i \\ Z_i \end{pmatrix} = R_j(\Theta, \Phi, \theta_j, \rho_j) \begin{pmatrix} x_{oij} \\ y_{oij} \\ z_{oij} \end{pmatrix} + \begin{pmatrix} h_{xj} \\ h_{yj} \\ h_{zj} \end{pmatrix} \qquad (4)$$

Where $$R_j(\Theta, \Phi, \theta_j, \rho_j) = \begin{pmatrix} R_{j11} & R_{j12} & R_{j13} \\ R_{j21} & R_{j22} & R_{j23} \\ R_{j31} & R_{j32} & R_{j33} \end{pmatrix} \qquad (5)$$

and $$R_{jlm} \equiv f(\Theta, \Phi, \theta_j, \rho_j), \; 1 \le l \le 3, \; 1 \le m \le 3 \qquad (6)$$

$R_{jlm}$ is a function of $\Theta, \Phi, \theta_j, \rho_j$. With the matrix operation, $\overline{P}_{ij}(x_{oij},y_{oij},z_{oij})$ can be computed as follows:

$$\begin{pmatrix} x_{oij} \\ y_{oij} \\ z_{oij} \end{pmatrix} = r_j(\Theta, \Phi, \theta_j, \rho_j) \left[ \begin{pmatrix} X_i \\ Y_i \\ Z_i \end{pmatrix} - \begin{pmatrix} h_{xj} \\ h_{yj} \\ h_{zj} \end{pmatrix} \right] \qquad (7)$$

where, $$r_j(\Theta, \Phi, \theta_j, \varphi_j) = R_j(\Theta, \Phi, \theta_j, \varphi_j)^{-1} \qquad (8)$$

$$= \begin{pmatrix} R_{j11} & R_{j12} & R_{j13} \\ R_{j21} & R_{j22} & R_{j23} \\ R_{j31} & R_{j32} & R_{j33} \end{pmatrix}^{-1}$$

$$= \begin{pmatrix} r_{j11} & r_{j12} & r_{j13} \\ r_{j21} & r_{j22} & r_{j23} \\ r_{j31} & r_{j32} & r_{j33} \end{pmatrix},$$

Expand Equation (7) to obtain $$\begin{pmatrix} x_{oij} \\ y_{oij} \\ z_{oij} \end{pmatrix} = \begin{pmatrix} r_{j11}(X_i - h_{xj}) + r_{j12}(Y_i - h_{yj}) + r_{j13}(Z_i - h_{zj}) \\ r_{j21}(X_i - h_{xj}) + r_{j22}(Y_i - h_{yj}) + r_{j23}(Z_i - h_{zj}) \\ r_{j31}(X_i - h_{xj}) + r_{j32}(Y_i - h_{yj}) + r_{j33}(Z_i - h_{zj}) \end{pmatrix} \qquad (9)$$

Substitute $Y_{oij}$ and $z_{oij}$ of Equation (9) into Equation (3) to obtain $$(f_j r_{j21} + r_{j31} y_{sij}) X_i + (f_j r_{j22} + r_{j32} y_{sij}) Y_i + (f_j r_{j23} + r_{j33} y_{sij}) Z_i = (f_j r_{j21} + r_{j31} y_{sij}) h_{xj} + (f_j r_{j22} + r_{j32} y_{sij}) h_{yj} + (f_j r_{j23} + r_{j33} y_{sij}) h_{zj} + f_j y_{sij} \qquad (10)$$

where, $1 \le i \le N$, $1 \le j \le M$, and N is the number of point light sources and M is the number of 1D optical lenses.

For N point light sources situated at $(X_i,Y_i,Z_i)$, 3N independent equations are required for solving the coordinates $(X_i,Y_i,Z_i)$ of all of N point light sources. Therefore, at least three 1D optical lenses (M=3) are required and installed in the proper focusing directions to satisfy the conditions of the 3N independent equations. However, if the arranged positions of the plurality of point light sources as shown in FIGS. 1(a) and 1(b) are conjugated, a superimposition will occur. Therefore, the condition of the 3N independent equations cannot be satisfied, and the coordinates of N point light sources cannot be obtained. As a result, the effect of the foregoing patented technology cannot be achieved.

For an independent solution of Equation (10), we have to avoid the aforementioned image superimposition. In other words, for N freely moving point light sources, the coordinates $(X_i,Y_i,Z_i)$ of each point light source can be calculated only when N independent and recognizable images $y_{sij}$ are obtained from each 1D optical lens $L_j$. For multiple point light sources arranged in a specific position or movement, a specific arrangement for the directions of the 1D optical lenses, or increasing the number of 1D optical lenses is an effective way to obtain the coordinates of multiple point light sources. However it is not a good solution for multiple freely moving point light sources which may easily cause the issue of the image superimposition. According to Equations (9) and (3), the image superimposition can be eliminated if the value $r_j(\Theta,\Phi,\theta_j,\rho_j)$ is varied properly. In other words, the relation of the coordinate transformed is changed to remove the image superimposition.

SUMMARY OF THE INVENTION

Therefore, it is a primary objective of the present invention to overcome the shortcomings of the prior art and provide a capability of recognizing spatial positions of multiple point light sources. For multiple point light sources arranged in a specific position or movement or in a freely moving condition, an optical system comprised of a plurality of 1D optical lenses and a logical analysis method are used for eliminating the image superimposition and computing the coordinates of multiple point light sources, so as to achieve the purpose of recognizing and tracking the multiple point light sources in the visual space.

The above and other objects, features and advantages of the present invention will become apparent from the following detailed description taken with the accompanying drawing.

BRIEF DESCRIPTION OF THE DRAWINGS

FIG. 1($b$) is a schematic view of the principle of imaging by a 1D horizontal focusing lens;

FIG. 2($b$) is a schematic view of the characteristic imaging of a vertical 1D focusing lens;

FIG. 2($c$) is a schematic view of the characteristic imaging of a 1D optical lens in arbitrary focusing direction;

FIG. 2($d$) is a schematic view of a 1D optical lens arranged arbitrarily in the space;

FIG. 3($b$) is a schematic view of an optical system in accordance with a second preferred embodiment of the present invention;

FIG. 3($c$) is a schematic view of an optical system in accordance with a third preferred embodiment of the present invention;

FIG. 3($d$) is a schematic view of an optical system in accordance with a fourth preferred embodiment of the present invention;

FIG. 3($e$) is a schematic view of an optical system in accordance with a fifth preferred embodiment of the present invention;

DESCRIPTION OF THE PREFERRED EMBODIMENT

Figure 1A:
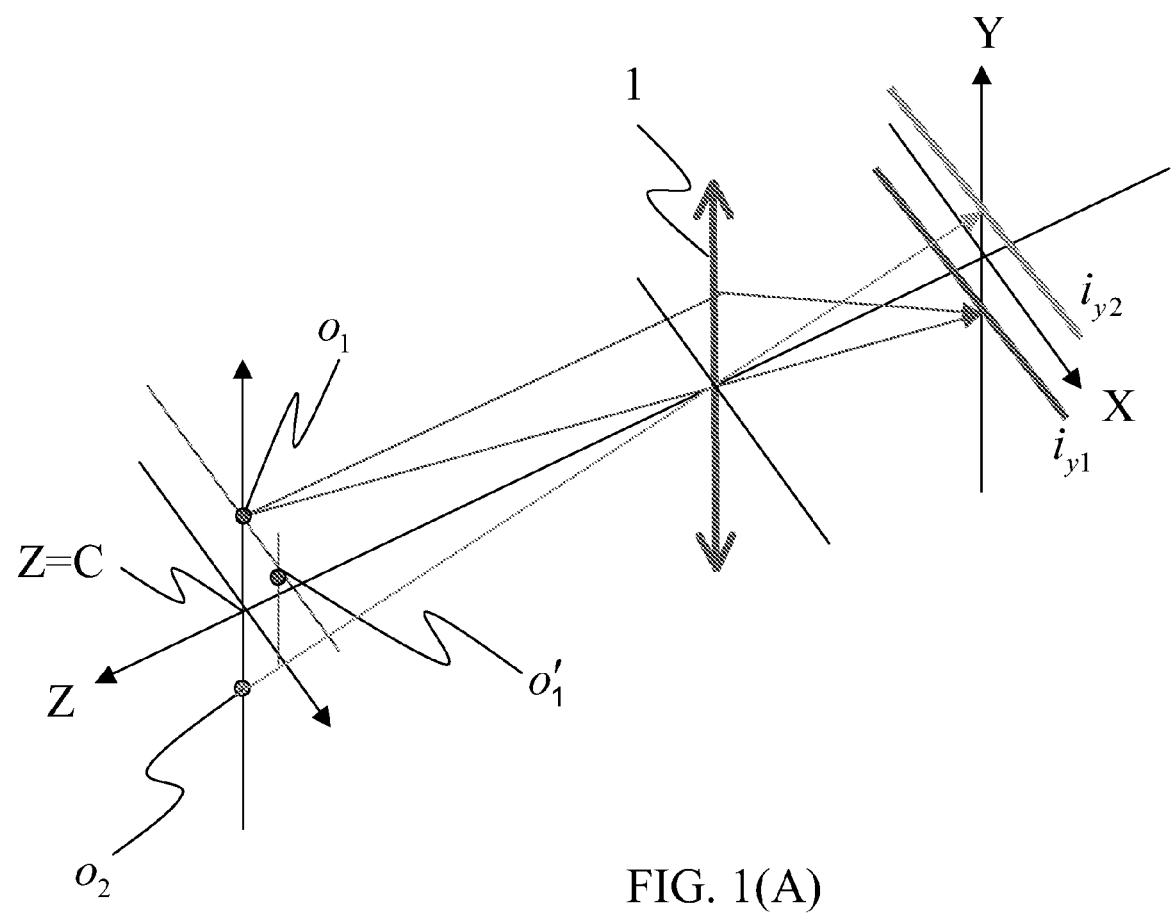
FIG. 1($a$) is a schematic view of the principle of imaging by a 1D vertical focusing lens.
Figure 1B:
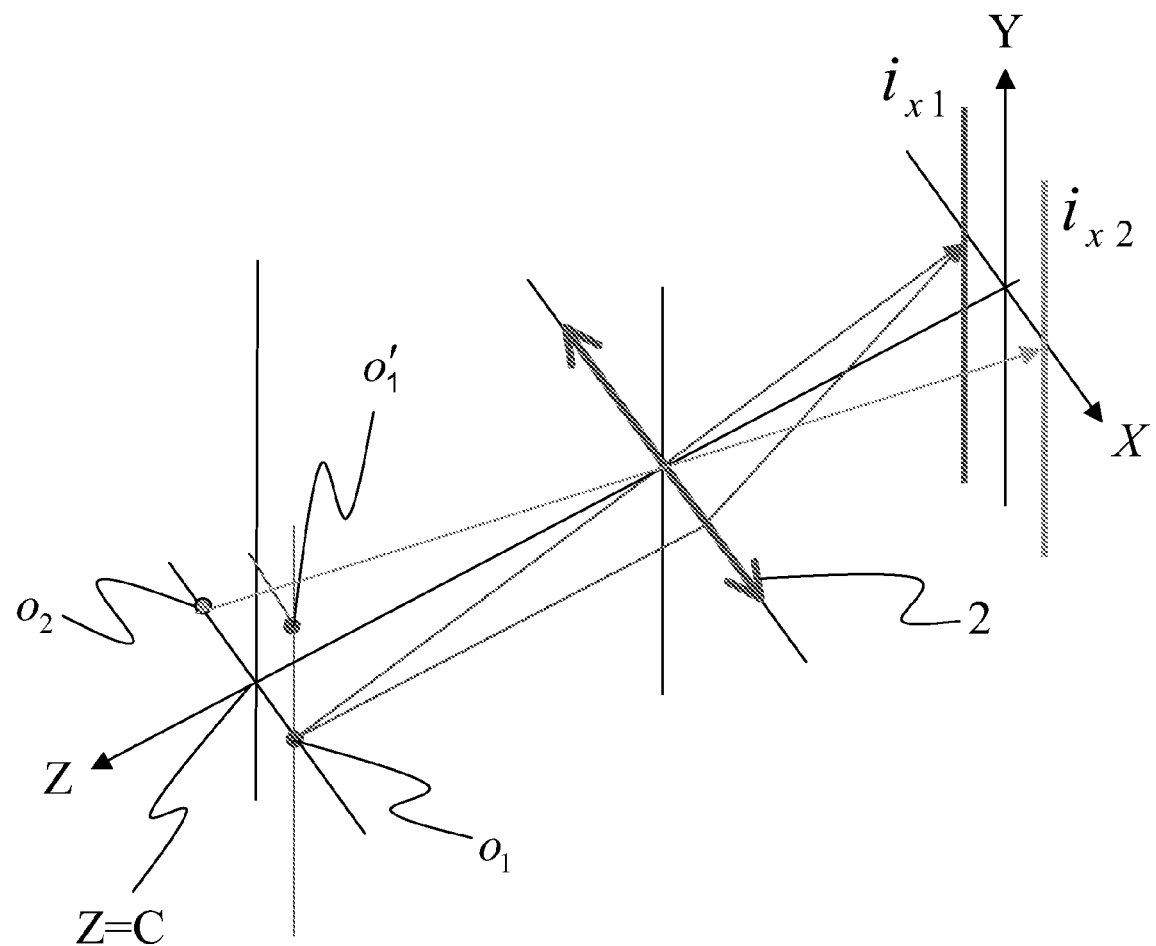
Figure 2A:
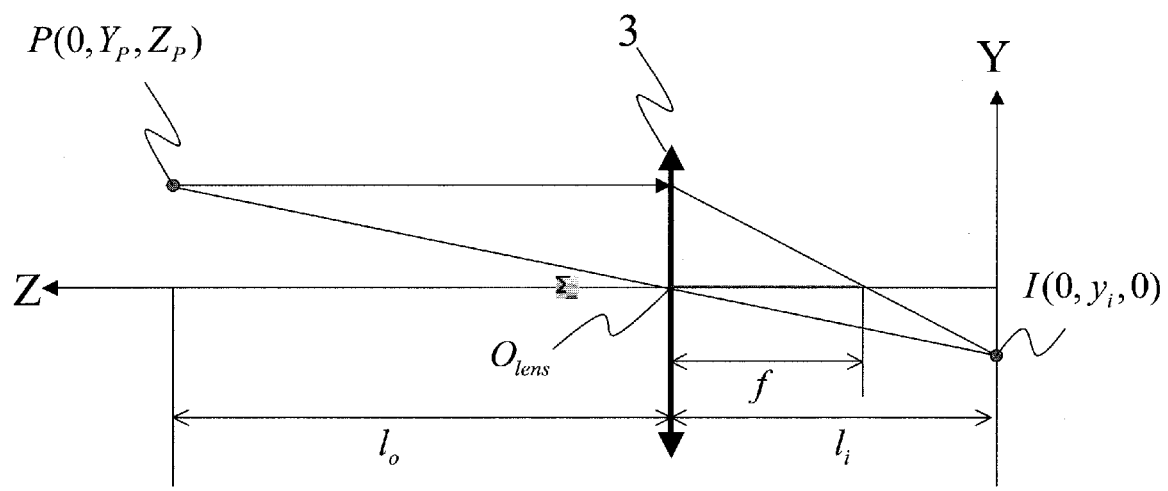
FIG. 2($a$) is a schematic view of the principle of imaging by a 1D vertical focusing lens.
Figure 2B:
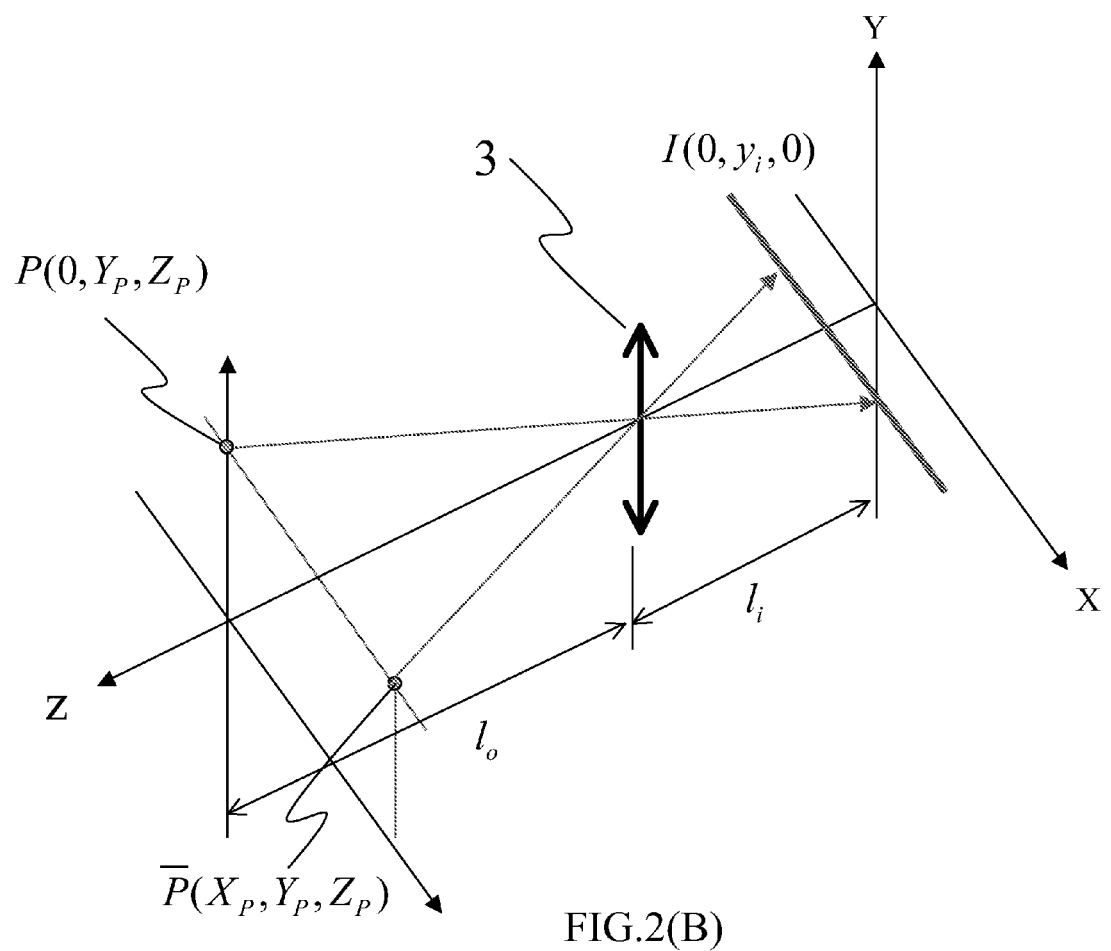
Figure 2C:
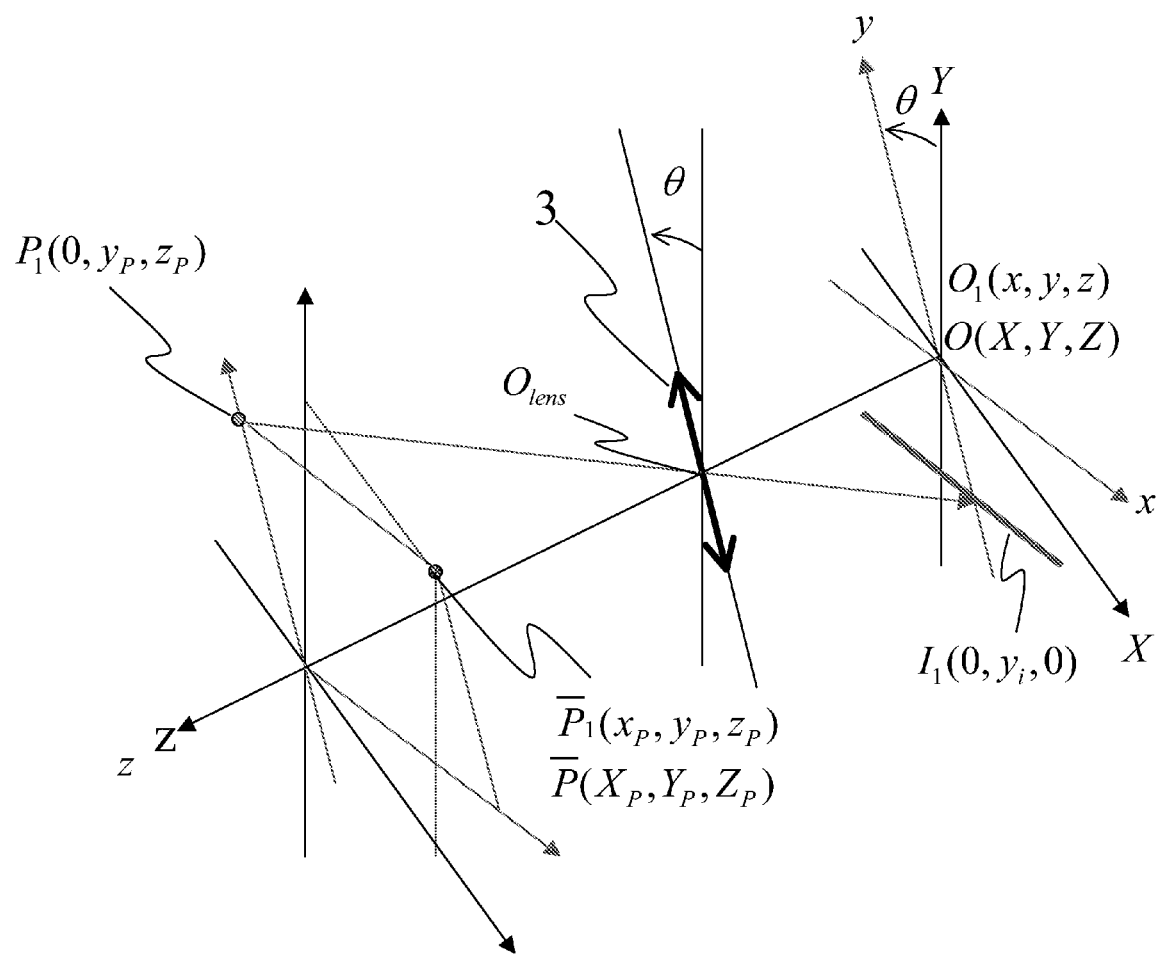
Figure 2D:
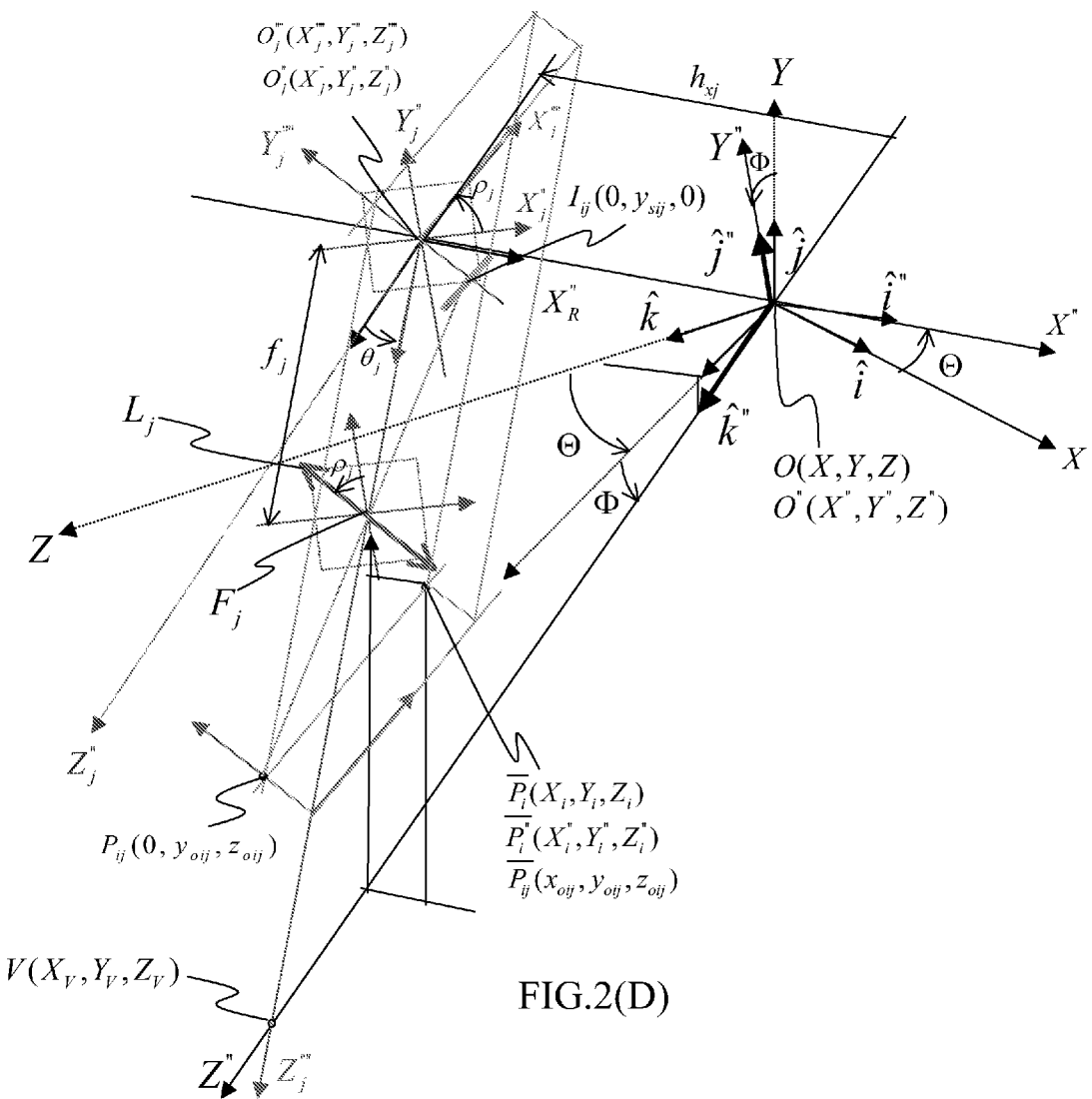

To make it easier for our examiner to understand the characteristics, objects and functions of the present invention, we use preferred embodiments and related drawings for the detailed description of the present invention as follows.

Embodiment 1

Refer to FIG. 3($a$) for a schematic view of an optical system in accordance with a third preferred embodiment of the present invention.

In this embodiment, a variable number N of freely moving point light sources $\overline{P}_i(X_i,Y_i,Z_i)$ with an arbitrary wavelength exists in a visual space, and an optical system of this embodiment is comprised of three 1D focusing lenses $L_1`L_2`L_3$ with a different focal length $f_j$ (where, $1 \leq j \leq 3$) or an equal focal length f. For simplicity, the equal focal length f is used for the illustration in the figures. For a world coordinate system O(X,Y,Z), the origins of the three freely rotating image coordinate systems $O_1(X_1,Y_1,Z_1)$, $O_2(X_2,Y_2,Z_2)$, $O_3(X_3,Y_3,Z_3)$ are disposed at any fixed positions $(h_{x1},h_{y1},h_{z1})$, $(h_{x2},h_{y2},h_{z2})$, $(h_{x3},h_{y3},h_{z3})$ or disposed along any one of the transverse axes. For simplicity, the symmetric positions along the X-axis are used for the illustration. In other words, the origins of the three image coordinate systems $O_1(X_1,Y_1,Z_1)$, $O_2(X_2,Y_2,Z_2)$, $O_3(X_3,Y_3,Z_3)$ are disposed at fixed positions (−h,0,0), (0,0,0), (h,0,0).

At the initial state, the $X_j, Y_j, Z_j$ axes (where, $1 \leq j \leq 3$) of the three image coordinate systems $O_1(X_1,Y_1,Z_1)$, $O_2(X_2,Y_2,Z_2)$, $O_3(X_3,Y_3,Z_3)$ are parallel to the X, Y, Z axes of the world coordinate system O(X,Y,Z) respectively. In the three image coordinate systems $O_1(X_1,Y_1,Z_1)$, $O_2(X_2,Y_2,Z_2)$, $O_3(X_3,Y_3,Z_3)$, the three 1D focusing lenses $L_1`L_2`L_3$ are installed at positions (0,0,f) along the $Z_j$ axis, and their focusing directions are parallel to the $Y_j$ axis. Further, three 1D image sensor $S_1 S_2 ` S_3$ having M×1 sensing pixels are disposed separately and fixed at the origin of each of the three image coordinate systems $O_1(X_1,Y_1,Z_1)$, $O_2(X_2,Y_2,Z_2)$, $O_3(X_3,Y_3,Z_3)$ respectively, and the direction of the long axis of each sensor is parallel to the focusing direction of the 1D focusing lens $L_1`L_2`L_3$. If another optical lens module is added to a rear end of the 1D focusing lens $L_1`L_2 L_3$ to correct the aberrations, such that the image is rotated by 90°, then the direction of the long axis of the 1D image sensor $S_1`S_2`S_3$ is perpendicular to the focusing direction of the 1D focusing lens $L_1`L_2`L_3$. Since the optical characteristics are the same, the present invention is not limited to the image rotation of 90° only, and thus such rotation will not be described here.

The world coordinate system O(X,Y,Z) may have three types of angular rotations, respectively a rotation of an arbitrary angle Θ with respect to the Y-axis, a rotation of an arbitrary angle Φ with respect to the X-axis, and a rotation of an arbitrary angle Ω with respect to the Z-axis. Therefore, any rotation with the angle of Θ, Φ, Ω of the world coordinate system O(X,Y,Z) can rotate the axis of $X_j, Y_j, Z_j$ of the three image coordinate systems $O_1(X_1,Y_1,Z_1)$, $O_2(X_2,Y_2,Z_2)$, $O_3(X_3,Y_3,Z_3)$ at the same time to change the direction of the 1D focusing lens $L_1`L_2`L_3$. Further, the three image coordinate systems $O_1(X_1,Y_1,Z_1)$, $O_2(X_2,Y_2,Z_2)$, $O_3(X_3,Y_3,Z_3)$ may have two types of angular rotations, respectively a rotation of an arbitrary angle $\theta_j$ with respect to the $Y_j$ axis and a rotation of an arbitrary angle $\rho_j$ with respect to the $Z_j$ axis $\sigma_j$ angle. Therefore, the image coordinate system $O_j(X_j,Y_j,Z_j)$ can be rotated to an angle $\theta_j, \rho_j$ to drive the 1D focusing lens $L_j$ and 1D sensor $S_j$ to rotate at the same time. Regardless of the type of the angular rotation, the relative angle between the focusing direction of the 1D focusing lens $L_j$ and the direction of the long axis of the 1D sensor $S_j$ remains unchanged.

As described above, if an image superimposition occurs, the values of the angles $(\theta_j,\rho_j)$ are changed appropriately to eliminate the image superimposition, and compute the object coordinates of the point light source $\overline{P}_i(X_i,Y_i,Z_i)$. Further, the center coordinates $(X_C,Y_C,Z_C)$ of the object point group are computed, and the angles (Θ,Φ) are changed to achieve the purpose of tracking the center of object point group. The logical analysis method comprises the following steps:

Step 1: Set the initial value of each angle $(\Omega,\Theta,\Phi,\theta_j,\rho_j)$ to an arbitrary value, preferably equal to (Ω=0°, Θ=0°,Φ=0°), or change and record the angles (Θ,Φ) to align the Z-axis with $(X_C,Y_C,Z_C)$, if the center coordinates $(X_C,Y_C,Z_C)$ of the object point group are known.

Step 2: Read the number N of point light sources $\overline{P}_i(X_i,Y_i,Z_i)$

Step 3: Read all images of the 1D optical lenses $L_j$, and obtain the number Nj of the line image and the coordinates $Y_{sij}$ of the line image by an imaging process.

Step 4: Change and record the angle $\rho_j$ or $\theta_j$ and go to Step 3, if the number Nj is not equal to N. Go to Step 5, if the number Nj is equal to N.

Step 5: Find the corresponding line image $(y_{si1}, y_{si2}, y_{si3})$ of the point light source $\overline{P}_i(X_i, Y_i, Z_i)$, and compute and output an object point coordinate $(X_i, Y_i, Z_i)$ according to Equation (10).

Step 6: Compute and output the center coordinates $(X_C, Y_C, Z_C)$ of the object point group according to Equation (2).

Step 7: Change and record the angle $(\Theta, \Phi)$ to align the Z-axis with $(X_C, Y_C, Z_C)$ to achieve the purpose of tracking the object point group.

Step 8: Return to Step 2.

Embodiment 2

Figure 3A:
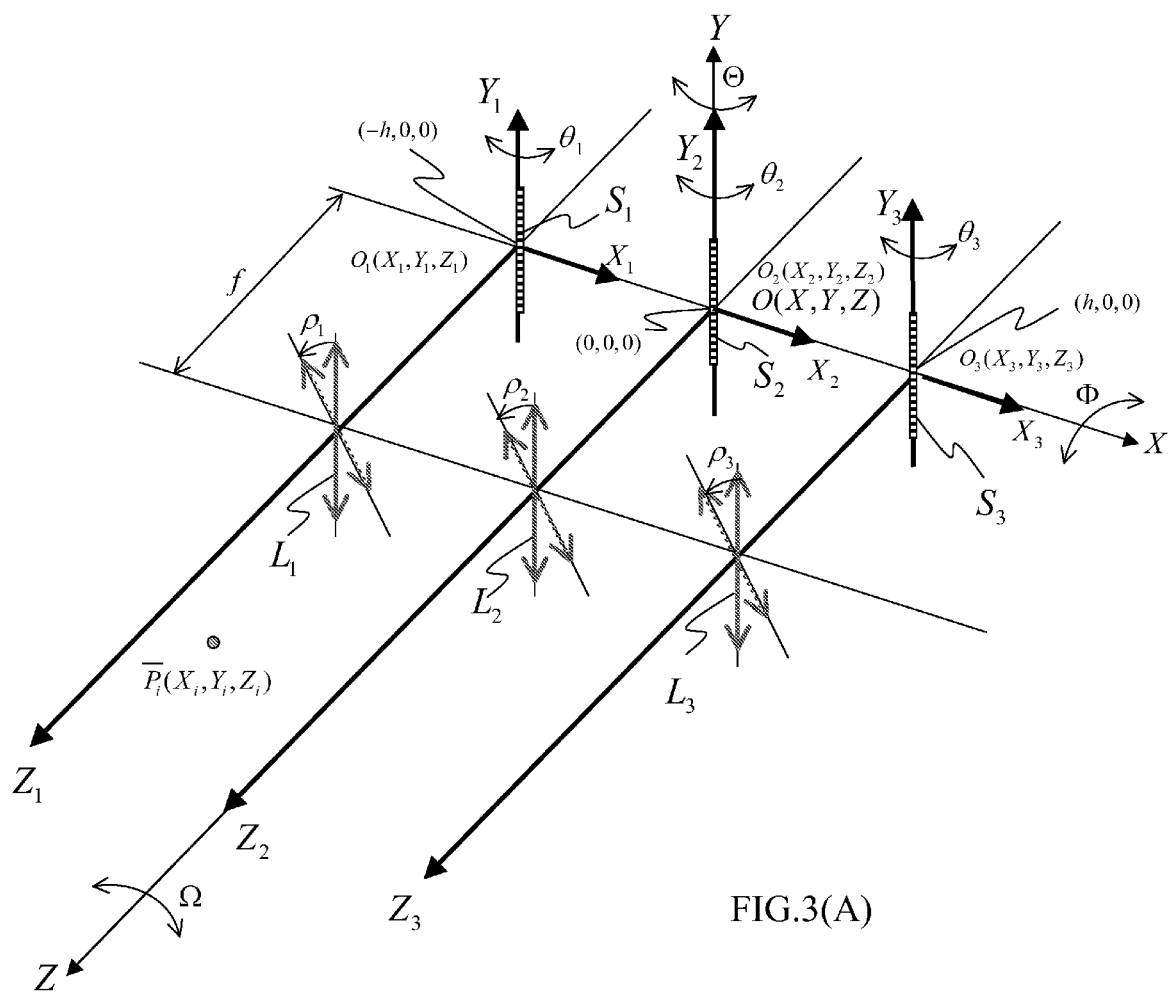
FIG. 3($a$) is a schematic view of an optical system in accordance with a first preferred embodiment of the present invention.
Figure 3B:
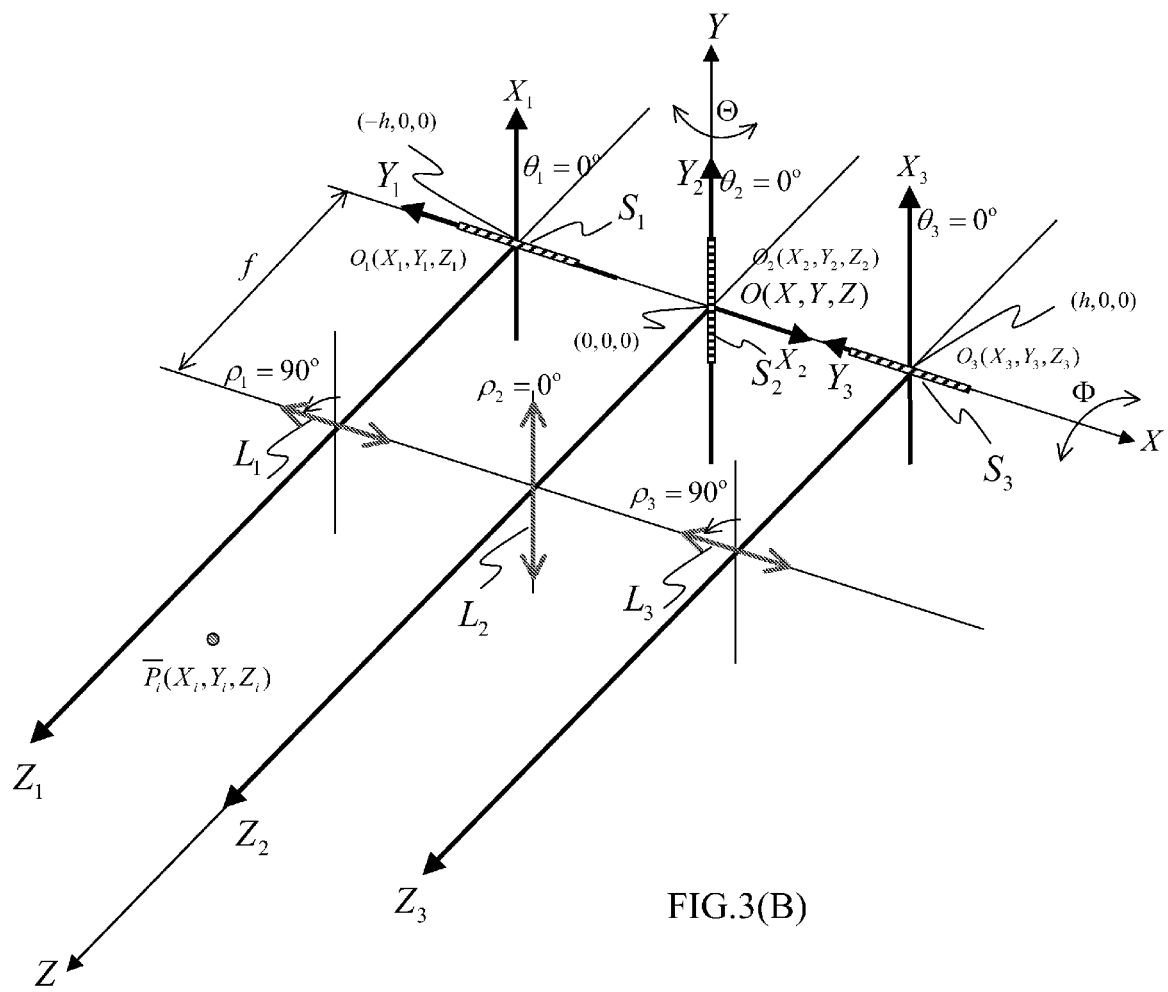

Refer to FIG. 3(b) for a schematic view of an optical system in accordance with a second preferred embodiment of the present invention.

The assembly of the optical system of the second preferred embodiment is substantially the same as that of the first preferred embodiment, except $\theta_1=\theta_2=\theta_3=0°$ and the focusing directions of the three 1D focusing lenses $L_1`L_2`L_3$ are set at an angle of $\rho_1=90°$, $\rho_2=0°$ and $\rho_3=90°$ respectively. Therefore, the direction of the long axis of the three 1D image sensors $S_1`S_2`S_3$ is set parallel to the of focusing direction of the three 1D focusing lenses $L_1`L_2`L_3$. As described above, if an image superimposition occurs, the value of the angle $\rho_j$ is changed to eliminate the image superimposition, and compute the object point coordinates $(X_i, y_i, Z_i)$ of point light sources $\overline{P}_i(X_i, Y_i, Z_i)$. In addition, the center coordinates $(X_C, Y_C, Z_C)$ of the object point group is computed, and the angles $(\Theta, \Phi)$ are changed to achieve the purpose of tracking the object point group. The logical analysis method comprises the following steps:

Step 1: Set the initial value of each angle $(\Omega, \Theta, \Phi, \theta_j, \rho_j)$ to $(\theta_1=\theta_2=0°, \theta_3=0°)$ and $(\rho_1=90°, \rho_{2=0}°, \rho_{3=90}°)$, and $(\Omega, \Theta, \Phi)$ can be any angle and preferably equal to $(\Omega=0°, \Theta=0°, \Phi=0°)$. Change and record the angle $(\Theta, \Phi)$ such that the Z-axis aligns with $(X_C, Y_C, Z_C)$, if the center coordinates $(X_C, Y_C, Z_C)$ of the object point group are known.

Step 2: Read the number N of point light sources $\overline{P}_i(X_i, Y_i, Z_i)$ Step 3: Read all images of 1D optical lenses $L_j$, and obtain the number Nj of the line image and the coordinates $y_{sij}$ of the line image by an imaging process.

Step 4: Change and record the angle $\rho_j$ if the number Nj is not equal to N, and then go to Step 3. If the number Nj is equal to N, then go to Step 5.

Step 5: Find the corresponding line image $(y_{si1}, y_{si2}, y_{si3})$ of the point light source $\overline{P}_i(X_i, Y_i, Z_i)$, and compute and output an object point coordinate $(X_i, Y_i, Z_i)$ according to Equation (10).

Step 6: Compute and output the center coordinates $(X_C, Y_C, Z_C)$ of the object point group according to Equation (2).

Step 7: Change and record the angle $(\Theta, \Phi)$ to align the Z-axis with $(X_C, Y_C, Z_C)$ to achieve the purpose of tracking the object point group.

Step 8: Return to Step 2.

Embodiment 3

Figure 3C:
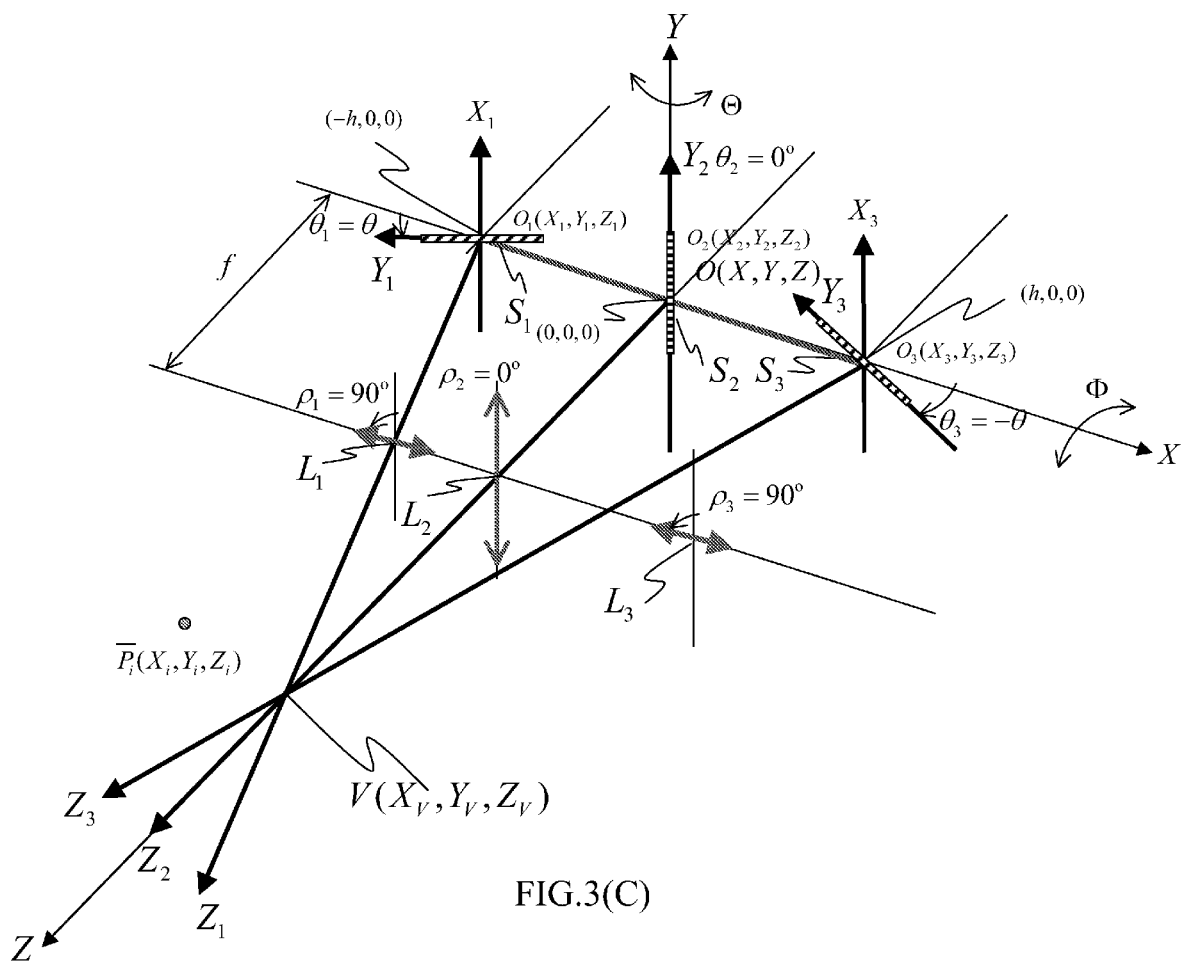

Refer to FIG. 3(c) for a schematic view of an optical system in accordance with a third preferred embodiment of the present invention.

The assembly of the optical system of the third preferred embodiment is substantially the same as that of the second preferred embodiment, except $\theta_1=\theta$, $\theta_2=0$, $\theta_3=-\theta$, and the $Z_j$ coordinates of the three image coordinate systems $O_1(X_1,Y_1,Z_1)$, $O_2(X_2,Y_2,Z_2)$, $O_3(X_3,Y_3,Z_3)$ are intersected at a point which is the convergent point $V(X_V, Y_V, Z_V)$. The coordinates $V(X_V, Y_V, Z_V)$ of the convergent point can be computed according to the angles $\Theta$, $\Phi$ and $\theta$. Further, the focusing directions of the three 1D focusing lenses $L_1`L_2`L_3$ are at $\rho_1=90°$, $\rho_2=0°$ and $\rho_3=90°$ respectively. Therefore, the directions of the long axes of the three 1D image sensors $S_1 S_2`S_3$ are parallel to the focusing directions of the three 1D focusing lenses $L_1`L_2`L_3$ respectively. As described above, if an image superimposition occurs, the value of the angle $\rho_j$ is changed appropriately to eliminate the image superimposition and compute the of object point coordinates $(X_i, Y_i, Z_i)$ of the point light source $\overline{P}_i(X_i, Y_i, Z_i)$. In addition, the center coordinates of the object point group are computed, and the angles $(\Theta, \Phi)$ are changed to achieve the purpose of tracking the object point group. The logical analysis method comprises the following steps:

Step 1: Set the initial value of each angle $(\Omega, \Theta, \Phi, \theta_j, \rho_j)$ to $(\theta_1=\theta, \theta_2=0°, \theta_3=-\theta)$ and $(\rho_1=90°, \rho_2=0°, \rho_3=90°)$, and the angles $(\Omega, \Theta, \Phi)$ are arbitrary and preferably equal to $(\Omega=0°, \Theta=0°, \Phi=0°)$, or change and record the angles $(\Theta, \Phi)$ to align the Z-axis with $(X_C, Y_C, Z_C)$, if the center coordinates $(X_C, Y_C, Z_C)$ of the object point group are known.

Step 2: Read the number N of point light sources $\overline{P}_i(X_i, Y_i, Z_i)$.

Step 3: Read images of all 1D optical lenses $L_i$ and obtain the number Nj of the line image and the coordinates $y_{sij}$ of the line image by an imaging process.

Step 4: Change and record the angle $\rho_j$ angle and go to Step 3, if the number Nj is not equal to N. If the number Nj is equal to N, go to Step 5.

Step 5: Find the corresponding line image $(y_{si1}, y_{si2}, y_{si3})$ of the point light source $\overline{P}_i(X_i, Y_i, Z_i)$, (and compute and output an object point coordinate $(X_i, Y_i, Z_i)$ according to Equation (10).

Step 6: Compute and output the center coordinates $(X_C, Y_C, Z_C)$ of the object point group according to Equation (2).

Step 7: Change and record the angle $(\Theta, \Phi)$ to align the Z-axis with $(X_C, Y_C, Z_C)$ to achieve the purpose of tracking the object point group.

Step 8: Return to Step 2.

Embodiment 4

Figure 3D:
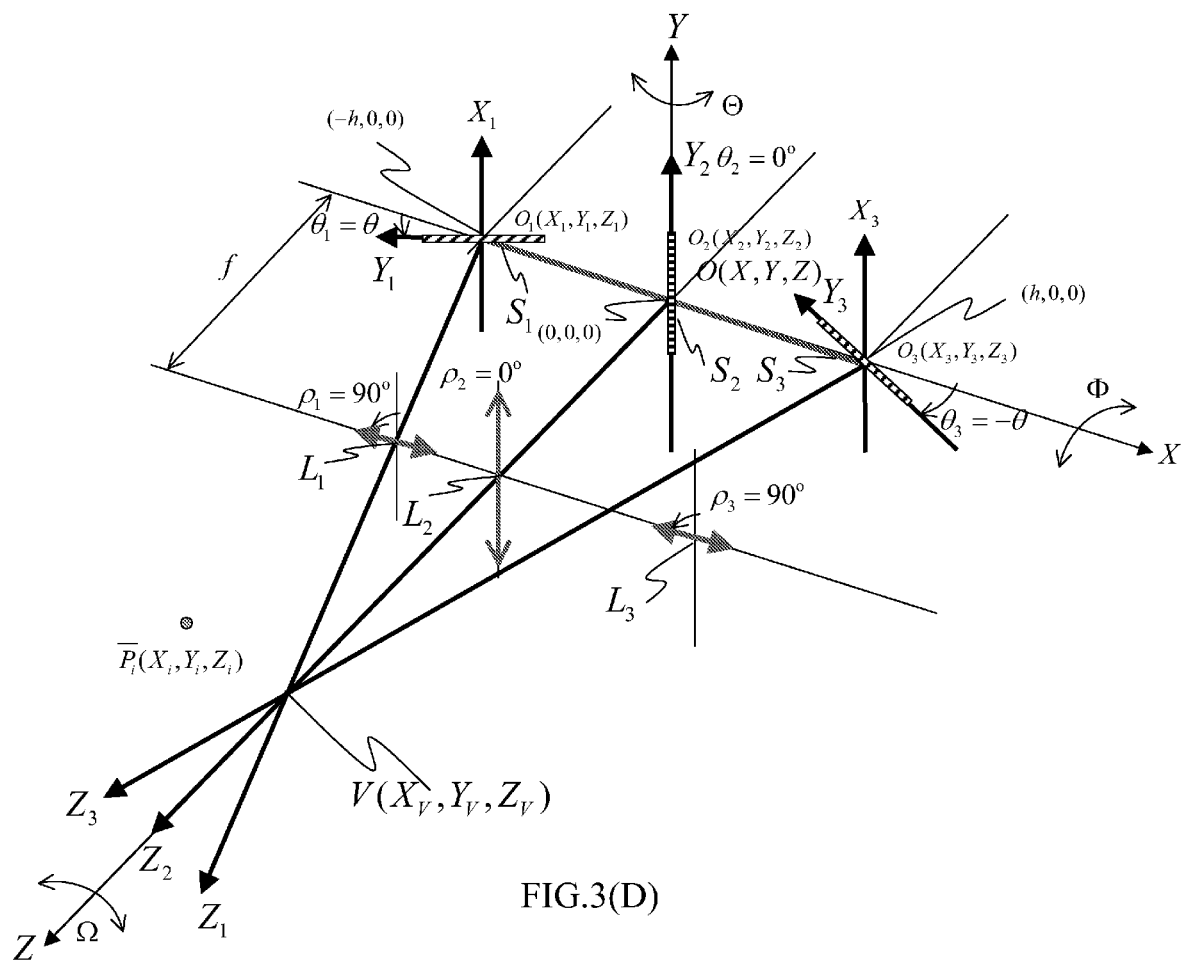

Refer to FIG. 3(d) for a schematic view of an optical system in accordance with a fourth preferred embodiment of the present invention. The assembly of the optical system of the fourth preferred embodiment is substantially the same as that of the third preferred embodiment, except when an image superimposition occurs, the value of the angle $\Omega$ is changed to eliminate the image superimposition, and calculate the object point coordinates $(X_i, Y_i, Z_i)$ of the point light sources $\overline{P}_i(X_i, Y_i, Z_i)$. The center coordinates of the object point group are computed and the angles $(\Theta, \Phi)$ are changed to achieve the purpose of tracking the object point group. The logical analysis method comprises the following steps:

Step 1: Set the initial value of each angle $(\Omega, \Theta, \Phi, \theta_j, \rho_j)$ to $(\theta_1=\theta, \theta_2=0°, \theta_3=-\theta)$ and $(\rho_1=90°, \rho_2=0°=\rho_3=90°)$, and the angles $(\Omega, \Theta, \Phi)$ are arbitrary and preferably equal to $(\Omega=0°, \Theta=0°, \Phi=0°)$, or change and record the angles $(\Theta, \Phi)$ to align the Z-axis with $(X_C, Y_C, Z_C)$ if the center coordinates $(X_C, Y_C, Z_C)$ of the object point group are known.

Step 2: Read the number N of point light sources $\overline{P}_i(X_i,Y_i,Z_i)$.

Step 3: Read images of all 1D optical lenses $L_j$, and obtain the number Nj of the line image and the coordinates $y_{sij}$ of the line image by an imaging process.

Step 4: Change and record the angle Ω and go to Step 3, if the number Nj is not equal to N. Go to Step 5, if the number Nj is equal to N.

Step 5: Find the corresponding line image $(y_{sij},y_{si2},y_{si3})$ of the point light source $\overline{P}_i(X_i,Y_i,Z_i)$, and compute and output an object point coordinate $(X_i,Y_i,Z_i)$ according to Equation (10).

Step 6: Compute and output the center coordinates $(X_C, Y_C, Z_C)$ of the object point group according to Equation (2).

Step 7: Change and record the angle (Θ,Φ) to align the Z-axis with $(X_C,Y_C,Z_C)$ to achieve the purpose of tracking the object point group.

Step 8: Return to Step 2.

Embodiment 5

Figure 3E:
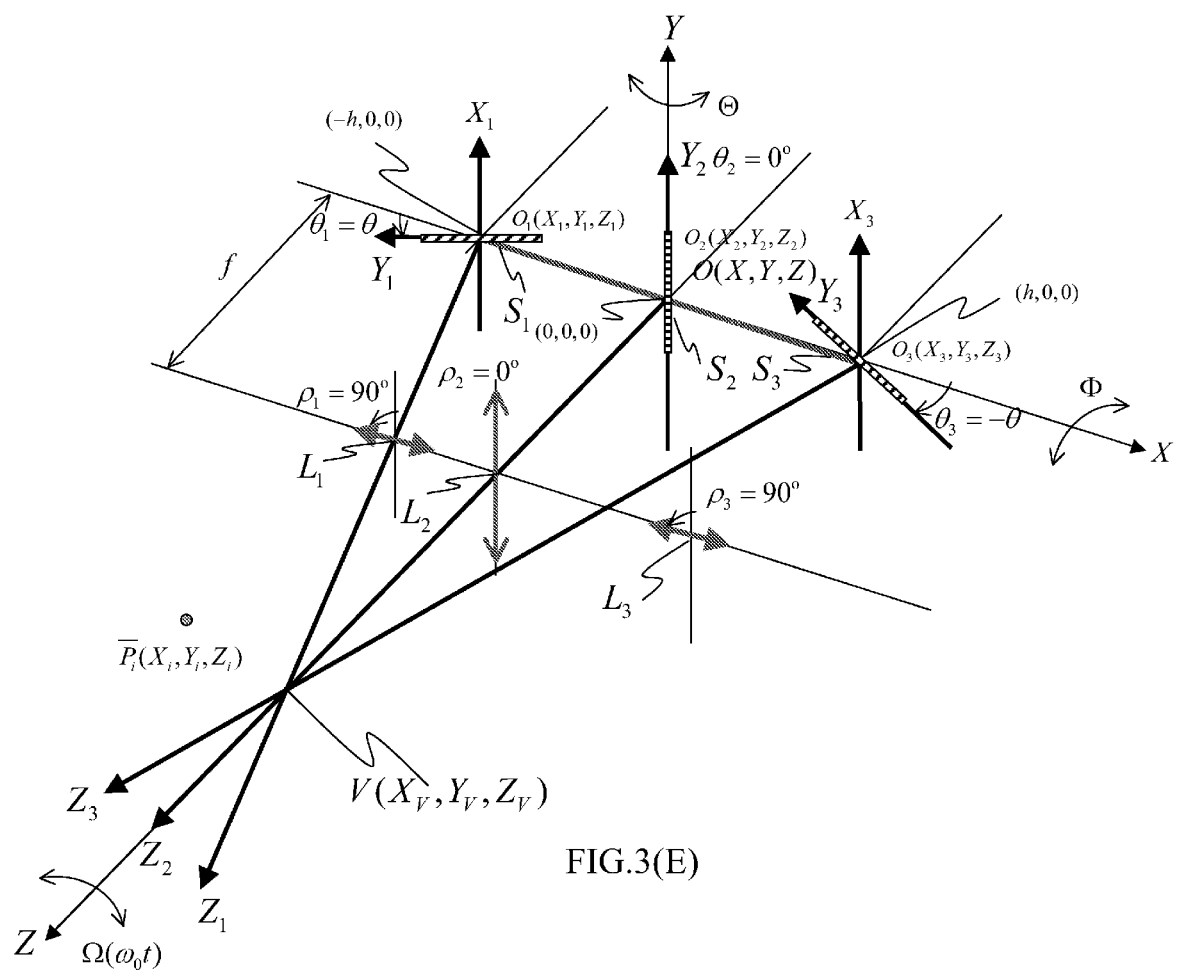

Refer to FIG. 3(e) for a schematic view of an optical system in accordance with a fifth preferred embodiment of the present invention.

The assembly of the optical system of the fifth preferred embodiment is substantially the same as that of the fourth preferred embodiment, except the angle Ω is rotated at an angular speed $\omega_o$. The logical analysis method comprises the steps of:

Step 1: Set the initial value of each angle (Θ,Φ,$\theta_j$,$\rho_j$) to ($\theta_1$=θ,$\theta_2$=0°, $\theta_3$=−θ) and ($\rho_1$=90°,$\rho_2$=0°,$\rho_3$=90°), and the angles (Θ,Φ) are arbitrary and preferably equal to (Θ=0°, Φ=0°), or change and record the angles (Θ,Φ) to align the Z-axis with $(X_C,Y_C,Z_C)$, if the center coordinates $(X_C,Y_C, Z_C)$ of the object point group are known (Θ,Φ). Finally, the angle Ω is rotated with an angular speed $\omega_o$.

Step 2: Read the number N of point light sources $\overline{P}_i(X_i,Y_i,Z_i)$

Step 3: Read the angle Ω and images of all 1D optical lenses $L_j$, and obtain the number Nj of line image and the coordinates $y_{sij}$ of the line image by an imaging process.

Step 4: Go to Step 3 if the number Nj is not equal to N. Go to Step 5 if the number Nj is equal to N.

Step 5: Find the corresponding line image $(y_{si1},y_{si2},y_{si3})$ of the point light source $\overline{P}_i(X_i,Y_i,Z_i)$, and compute and output an object point coordinate $(X_i,Y_i,Z_i)$ according to Equation (10).

Step 6: Compute and output the center coordinates $(X_C, Y_C, Z_C)$ of the object point group according to Equation (2).

Step 7: Change and record the angle (Θ,Φ) to align the Z-axis with $(X_C,Y_C,Z_C)$ to achieve the purpose of tracking the object point group.

Step 8: Return to Step 2.

Embodiment 6

Figure 4:
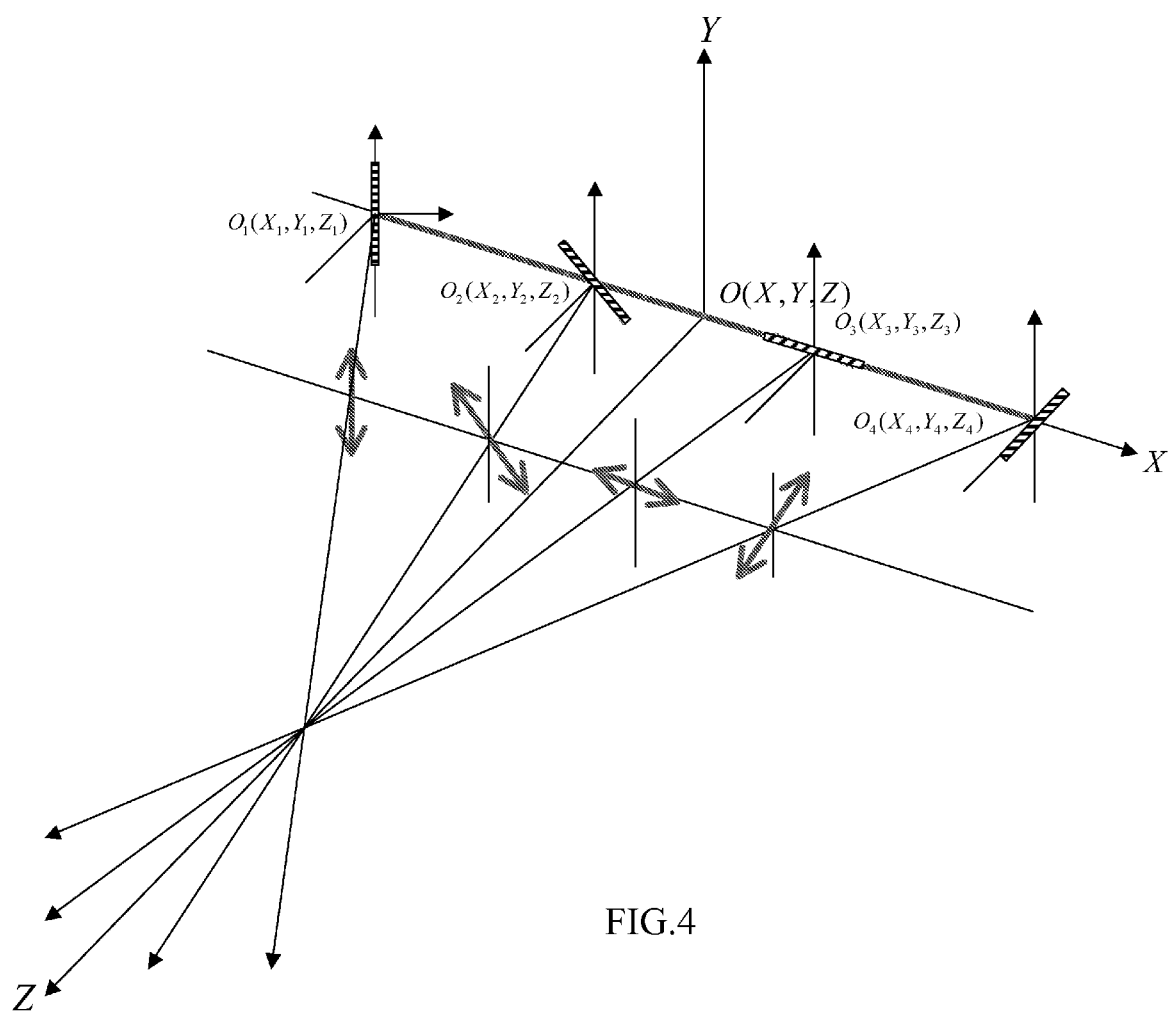
FIG. 4 is a schematic view of an optical system in accordance with a sixth preferred embodiment of the present invention.

Refer to FIG. 4 for a schematic view of an optical system in accordance with a sixth preferred embodiment of the present invention.

The characteristics of the assembly of the optical system of the sixth preferred embodiment is substantially the same as those of the first to fifth preferred embodiments, except the number of 1D focusing lenses is greater than 3. For simplicity, only four 1D focusing lenses are used for the illustration here.

Figure 5:
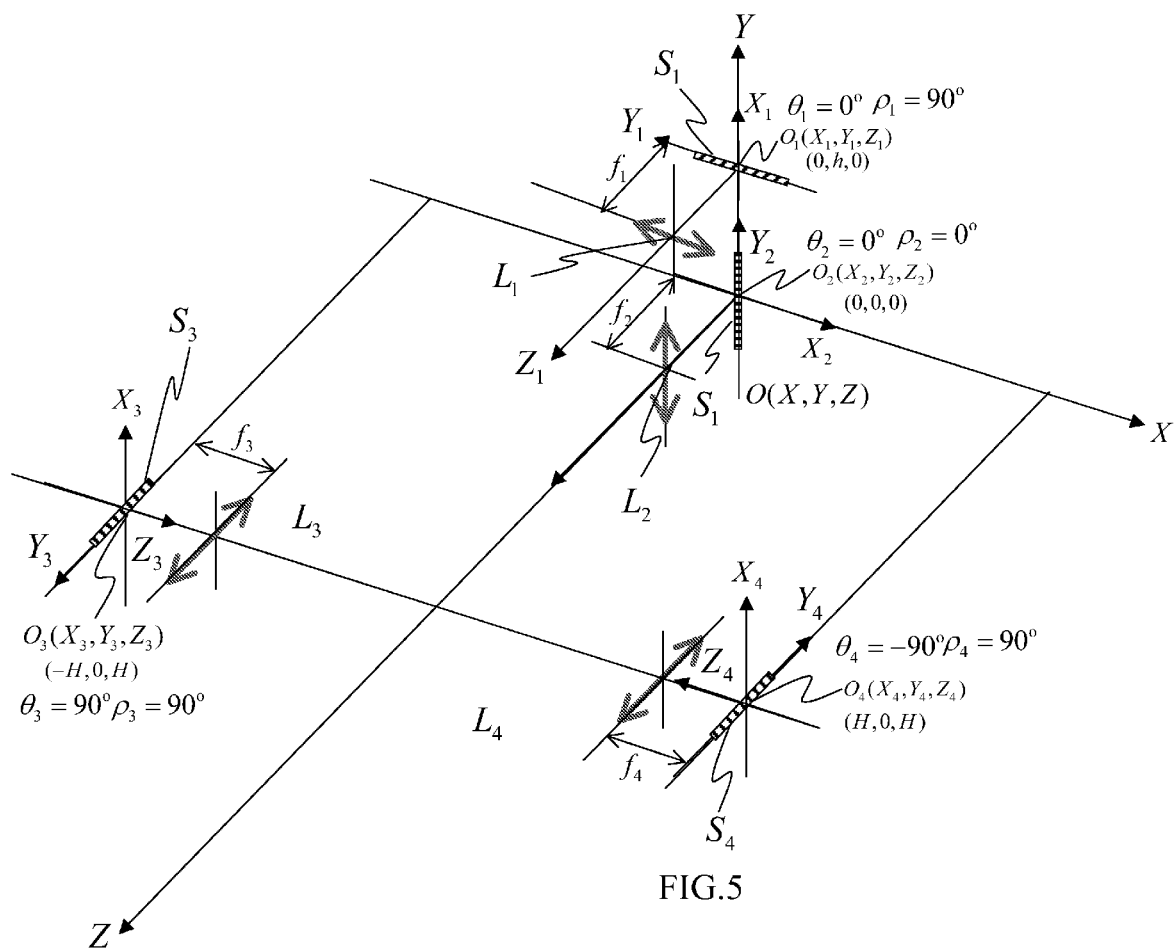
FIG. 5 is a schematic view of an optical system in accordance with a seventh preferred embodiment of the present invention.

Refer to FIG. 5 for a schematic view of an optical system in accordance with a seventh preferred embodiment of the present invention.

The optical system in accordance with the seventh preferred embodiment is comprised of four 1D focusing lenses A'±2'o'±4 and four 1D image sensors $S_1$`$S_2$`$S_3$ The four 1D focusing lenses $L_1$`$L_2$`$L_3$ have focal lengths $f_1$`$f_2$`$f_3$`$f_4$ respectively. In the world coordinate system O(X,Y,Z), the origins of the image coordinate systems $O_1(X_1,Y_1,Z_1)$ $O_2(X_2,Y_2,Z_2)$, $O_3(X_3,Y_3,Z_3)$, $O_4(X_4,Y_4,Z_4)$ are disposed at positions (0,h,0), (0,0,0), (−H,0,H), (H,0,H) respectively, and the orientating angles are $\theta_1$=0°, $\theta_2$=0°,$\theta_3$90°,$\theta_4$=−90° and $\rho_1$=90°,$\rho_{2=0}$°,$\rho_3$=90°,$\rho_{4=90}$°. Further, the logical analysis method of the seventh preferred embodiment is the same as those of the first to fifth preferred embodiments.

In summation of the description above, the technical characteristics of the method of the invention and each preferred embodiment are disclosed fully to demonstrate the purpose and effects of the present invention, and the invention complies with the requirements of patent application, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A method of recognizing and tracking multiple spatial points, comprising:
    a plurality of point light sources, each being capable of moving freely, having an arbitrary wavelength and a variable quantity of N point light sources;
    an optical system, comprised of a plurality of 1D focusing lens modules; and
    a logical analysis method, for eliminating an image superimposition phenomenon and performing a computation to obtain coordinates of object points of the plurality of point light sources.

2. The method of recognizing and tracking multiple spatial points of claim 1, wherein the plurality of point light sources are an active point light source capable of emitting point scattering lights or a passive point light source, which reflects a point light source.

3. The method of recognizing and tracking multiple spatial points of claim 1, wherein the 1D focusing lens module is comprised of a 1D focusing lens and a rectangular 1D image sensor.

4. The method of recognizing and tracking multiple spatial points of claim 1, wherein the 1D focusing lens module is comprised of a 1D focusing lens, an aberration correction lens module, and a rectangular 1D image sensor.

5. The method of recognizing and tracking multiple spatial points of claim 1, wherein the optical system is comprised of three 1D focusing lens modules.

6. The method of recognizing and tracking multiple spatial points of claim 1, wherein the optical system is comprised of at least four 1D focusing lens modules.

7. The method of recognizing and tracking multiple spatial points of claim 3, wherein the 1D focusing lens has a focusing direction same as the direction along the longer axis of the 1D image sensor.

8. The method of recognizing and tracking multiple spatial points of claim 4, wherein the 1D focusing lens has a focusing direction same as or perpendicular to the direction along the longer axis of the 1D image sensor.

9. The method of recognizing and tracking multiple spatial points of claim 5 or 6, wherein the 1D focusing lens modules are installed at arbitrary positions in the visual space.

10. The method of recognizing and tracking multiple spatial points of claim 5 or 6, wherein the focusing directions of 1D focusing lenses modules are installed in arbitrary orientation in the visual space.

11. The method of recognizing and tracking multiple spatial points of claim 5 or 6, wherein the 1D focusing lens modules have arbitrary focal lengths or equal focal lengths.

12. The method of recognizing and tracking multiple spatial points of claim 5 or 6, wherein all 1D focusing lens modules are installed at positions along the transverse axis of the visual space coordinate system and equidistant with each other, and arranged symmetrically with the origin of the visual space coordinates.

13. The method of recognizing and tracking multiple spatial points of claim 1, wherein the logical analysis method comprises:
   an initial setting step, for setting and recording an initial value of each angle $(\Omega,\Theta,\Phi,\theta_j,\rho_j)$, and reading the number N of point light sources $\overline{P}_i(X_i,Y_i,Z_i)$;
   an image processing step, for reading images of all 1D optical lenses $L_j$, and obtaining the number Nj of the line image and the coordinates $y_{sij}$ of the line image;
   an image superimposition eliminating step, for eliminating an image superimposition by changing the focusing directions of 1D focusing lenses modules, if the image superimposition occurs and the number Nj of the line image of the lenses $L_j$ is not equal to N;
   an image corresponding to an object point coordinate computing step, for computing the object point coordinates $(X_i,Y_i,Z_i)$ after finding the corresponding point image $(y_{si1},y_{si2},y_{si3})$ of the point light sources $\overline{P}_i(X_i,Y_i,Z_i)$ by a corresponding logic; and
   an object point group tracking step, for changing the angle of the optical axis of the optical system after computing the center coordinates $(X_C,Y_C,Z_C)$ of the object point group, such that the optical axis is aligned with the center coordinates of the object point group to achieve the purpose of tracking the object point group.

14. The method of recognizing and tracking multiple spatial points of claim 13, wherein the initial setting step sets the initial values of $(\Omega,\Theta,\Phi,\theta_j,\rho_j)$, and the values of $(\Omega,\Theta,\Phi,\theta_j,\rho_j)$ are arbitrary, or the values of $(\Omega,\Theta,\Phi)$ are set to $(\Omega=0°, \Theta=0°,\Phi=0°)$, and if the center coordinates $(X_C,Y_C,Z_C)$ of the object point group are known, the angles $(\Theta,\Phi)$ are changed and recorded, so that the Z-axis aligns with $(X_C,Y_C,Z_C)$.

15. The method of recognizing and tracking multiple spatial points of claim 13, wherein the initial values of $(\Omega,\Theta,\Phi,\theta_j,\rho_j)$ are set, and $(\theta_j,\rho_j)$ are set to $(\theta_1=0°,\theta_2=0°,\theta_3=0°)$ and $(\rho_1=90°,\rho_2=0°, \rho_3=90°)$ when the number of the 1D focusing lens module is three.

16. The method of recognizing and tracking multiple spatial points of claim 13, wherein the initial values of $(\Omega,\Theta,\Phi,\theta_j,\rho_j)$ are set, and $(\theta_j,\rho_j)$ are set to $(\theta_1=\theta,\theta_2=0°,\theta_3=-\theta)$, $(\rho_1=90°,\rho_2=0°,\rho_3=90°)$, and $\theta\geqq0°$ when the number of the 1D focusing lens module is three.

17. The method of recognizing and tracking multiple spatial points of claim 13, wherein the image superimposition eliminating step is achieved by adjusting one of the angles $\rho_j,\theta_j$, and $\Omega$.

18. The method of recognizing and tracking multiple spatial points of claim 13, wherein the image superimposition eliminating step is achieved by rotating the angle $\Omega$ with a constant angular velocity.

19. The method of recognizing and tracking multiple spatial points of claim 13, wherein the object point coordinates of the point light sources $\overline{P}_i(X_i,Y_i,Z_i)$ is computed by $$(f_j r_{j21}+r_{j31}y_{sij})X_i+(f_j r_{j22}+r_{j32}y_{sij})Y_i+(f_j r_{j23}+r_{j33}y_{sij})Z_i = (f_j r_{j21}+r_{j31}y_{sij})h_{xj}+(f_j r_{j22}+r_{j32}y_{sij})h_{yj}+(f_j r_{j23}+r_{j33}y_{sij})h_{zj}+f_j y_{sij}.$$

20. The method of recognizing and tracking multiple spatial points of claim 13, wherein the center coordinates $(X_C,Y_C,Z_C)$ of the object point group is computed by $$X_C = \frac{\sum_{i=1,N} X_i}{N}; Y_C = \frac{\sum_{i=1,N} Y_i}{N}; Y_C = \frac{\sum_{i=1,N} Z_i}{N}.$$

21. The method of recognizing and tracking multiple spatial points of claim 13, wherein the method of tracking the object point group is achieved by adjusting the angle $(\Theta,\Phi)$ to align the Z-axis with the $(X_C,Y_C,Z_C)$.

22. The method of recognizing and tracking multiple spatial points of claim 6, wherein the origin of the image coordinate system are disposed at positions (0,h,0) (0,0,0) (−H,0,H) (H,0,H) in the visual space coordinate system respectively, and h and H are real numbers when the number of the 1D focusing lens module is four.

23. The method of recognizing and tracking multiple spatial points of claim 13, wherein the focusing directions of the four 1D focusing lens modules are set at angles of $(\theta_1=0°, \theta_2=0°,\theta_3=90°,\theta_4=-90°)$ and $(\rho_1=90°,\rho_2=0°,\rho_3=90°,\rho_4=90°)$ when the number of the 1D focusing lens module is four.

* * * * *